US007969134B2

(12) United States Patent
Chen (10) Patent No.: US 7,969,134 B2
(45) Date of Patent: Jun. 28, 2011

(54) METHOD OF FORMING A POWER SUPPLY CONTROLLER AND STRUCTURE THEREFOR

(75) Inventor: Gang Chen, Hong Kong (CN)

(73) Assignee: Semiconductor Components Industries, LLC, Phoenix, AZ (US)

( * ) Notice: Subject to any disclaimer, the term of this patent is extended or adjusted under 35 U.S.C. 154(b) by 317 days.

(21) Appl. No.: 12/056,531

(22) Filed: Mar. 27, 2008

(65) Prior Publication Data

US 2009/0243580 A1    Oct. 1, 2009

(51) Int. Cl.
*G05F 1/00* (2006.01)
(52) U.S. Cl. ........................................... 323/285
(58) Field of Classification Search .................. 323/252, 323/271, 274, 275, 277, 281, 283, 285, 286, 323/288, 293
See application file for complete search history.

(56) References Cited

U.S. PATENT DOCUMENTS

| 6,396,252 | B1* | 5/2002 | Culpepper et al. | 323/285 |
| 7,132,818 | B2* | 11/2006 | Matsuura | 323/222 |
| 2003/0038681 | A1* | 2/2003 | Djafari et al. | 331/1 A |
| 2004/0136206 | A1* | 7/2004 | Kinoshita et al. | 363/16 |
| 2006/0043943 | A1* | 3/2006 | Huang et al. | 323/222 |
| 2006/0043955 | A1* | 3/2006 | Hung | 323/283 |
| 2006/0055385 | A1* | 3/2006 | Schiff | 323/282 |

* cited by examiner

*Primary Examiner* — Adolf Berhane
*Assistant Examiner* — Jeffrey Gblende
(74) *Attorney, Agent, or Firm* — Robert F. Hightower (57) ABSTRACT

In one embodiment, a power supply controller is configured to select either an error signal or a variable reference signal to control an on-time of the switching output signal of the power supply controller.

20 Claims, 5 Drawing Sheets

METHOD OF FORMING A POWER SUPPLY CONTROLLER AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to form switching power regulator circuits. Many switching regulator circuits were designed to reduce the amount of power delivered to load when the amount of current required by the load decreased. This was often called burst mode or skip cycle mode. When the load again required a higher current, the switching regulator exited the burst mode or skip cycle mode and returned to normal operation. Typically, the transition from the burst mode to the normal operation mode resulted in excessive ripple current in the output voltage supplied by the system using the switching regulator.

Accordingly, it is desirable to have a switching regulator that minimizes the amount of ripple in the output current during the skip-cycle mode, and that minimizes the amount of ripple during the transition from skip-cycle mode back to normal mode.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten per cent (10%) are reasonable variances from the ideal goal of exactly as described.

DETAILED DESCRIPTION OF THE DRAWINGS

Figure 1:
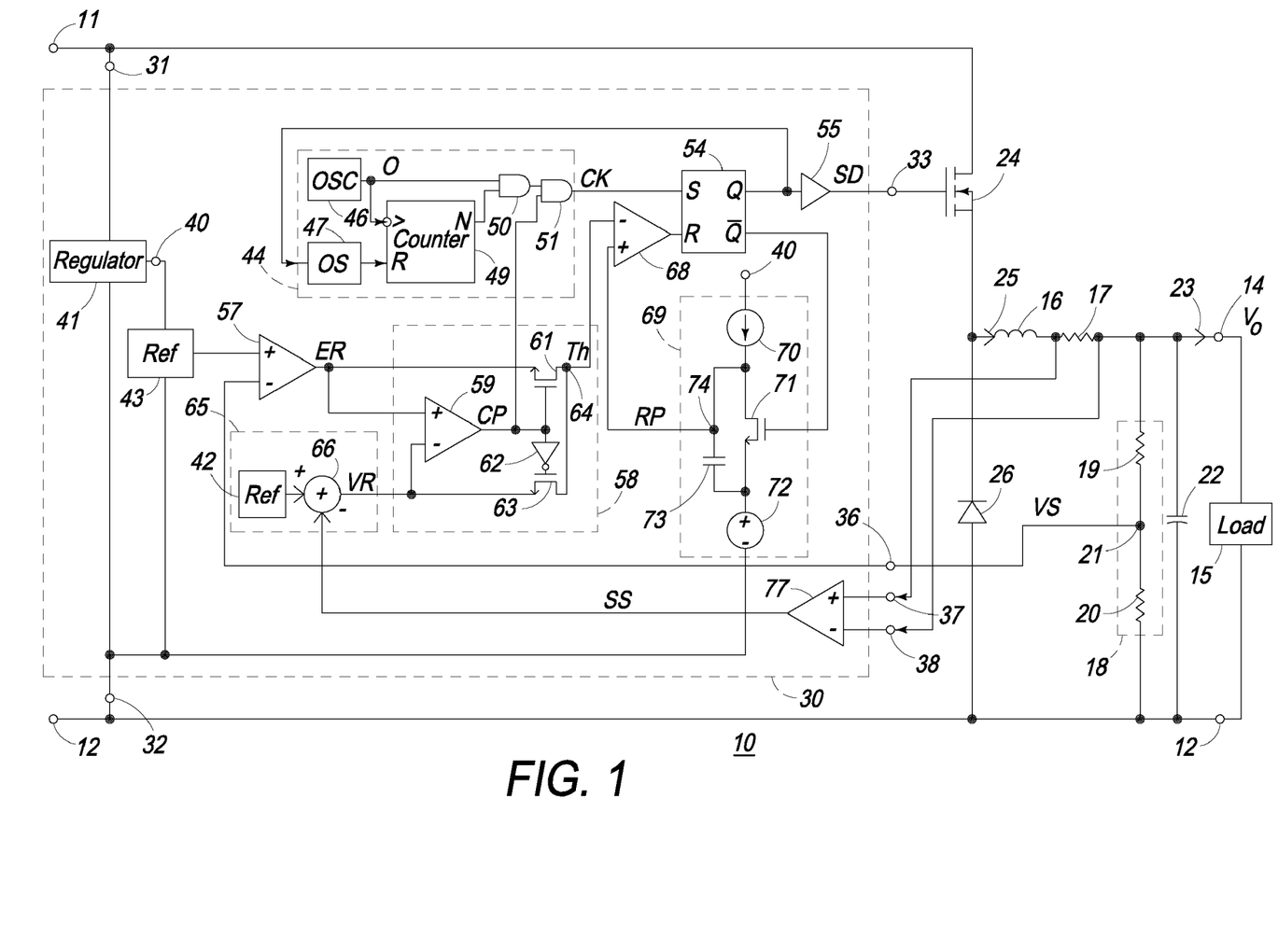
FIG. 1 schematically illustrates an embodiment of a portion of a power supply system that includes a switching power supply controller in accordance with the present invention.

FIG. 1 schematically illustrates an embodiment of a portion of a power supply system 10 that includes a switching power supply controller 30. System 10 receives power between a power input terminal 11 and a power return terminal 12 and forms an output voltage (Vo) between a voltage output 14 and terminal 12. Controller 30 is configured to regulate the output voltage to a desired value or target value within a range of values around the target value. For example, the target value may be five volts (5 v) and the range of values may be plus or minus five percent (5%) around the five volts. System 10 also usually includes a power switch such as a power transistor 24, and a synchronous rectifier such as a diode 26, that are connected to control an inductor current 25 that flows through an inductor 16. A capacitor 22 is connected between output 14 and terminal 12 in order to assist in forming the output voltage (Vo). A current sense element, such as a resistor 17, generally is connected to produce a first feedback signal as a current sense signal that is representative of the instantaneous value of inductor current 25. A voltage sense network 18, such as series connected resistors 19 and 20, may be coupled to output 14 to provide a second feedback signal such as a voltage sense (VS) signal at a node 21 that is representative of the instantaneous value of the output voltage (Vo). Those skilled in the art will appreciate that diode 26 may be replaced by a power transistor that is controlled to operate as a synchronous rectifier. Additionally, voltage sense network 18 may be any type of sensing network that provides a signal that is representative of the value of the output voltage. A load 15 generally is connected between output 14 and terminal 12 in order to receive the output voltage (Vo) and to also receive a load current 23 from both capacitor 22 and from current 25.

Switching power supply controller 30 receives operating power between a voltage input 31 and a voltage return 32. Input 31 and return 32 typically are connected to respective terminals 11 and 12. Controller 30 is configured to form a switching drive signal on an output 33 that is suitable for driving and operating transistor 24 to regulate the value of the output voltage. The voltage sense (VS) signal from network 18 is received by controller 30 on a VS input 36. Current sense inputs 37 and 38 of controller 30 generally are connected to receive the current sense signal from resistor 17.

Controller 30 includes a clock circuit 44 that generates a clock (CK) signal that assists in forming the switching drive (SD) signal on output 33. The exemplary embodiment of clock circuit 44 that is illustrated in FIG. 1 includes a free running oscillator or Osc or oscillator 46, a one-shot (OS) 47, a digital counter 49, an AND gate 50, and an AND gate 51. A switching control comparator 68, a PWM latch 54, and a buffer driver or buffer 55 function as a switching control block that further assists in forming the switching drive signal. A ramp generator 69 is utilized to generate a ramp (RP) signal that further assists in forming the switching drive signal (SD). Ramp generator 69 usually includes a substantially constant current source 70, a capacitor 73, and a discharge switch such as a transistor 71. Ramp generator 69 may also include an offset voltage form an offset circuit 72 that may be used to ensure that the lowest level of the ramp signal is greater than the lowest level of ER signal. However, ramp generator 69 may have other embodiments as long as the ramp circuit forms a ramp signal that is initiated by a switching drive signal. Controller 30 also generally includes an error amplifier 57, a reference generator or ref 43, a variable reference circuit or variable reference generator 65, a control circuit 58, and a sense amplifier 77. Error amplifier 57 receives the VS signal and the reference signal from ref 43 and responsively forms an error (ER) signal that is representative of the difference between the value of the output voltage and the desired value of the output voltage. As is well known to those skilled in the art, error amplifier 57 generally includes various impedances that are utilized to control the gain of amplifier 57 in addition to the poles and zeros of the closed loop system formed by controller 30. Variable reference generator 65 includes a reference generator or ref 42 and a summing circuit or adder 66 that subtracts the output of amplifier 77 from the output of ref 42. As will be seen further hereinafter, variable reference generator 65 forms a reference signal having a value that varies responsively to the instantaneous value of inductor current 25. The exemplary embodiment of control circuit 58 illustrated in FIG. 1 includes a control comparator 59, an inverter 62, and analog switches such as transistors 61 and 63. As will be seen further hereinafter, control circuit 58 is configured to form a threshold (Th) signal having a value that is selectively formed to be substantially equal to the error (ER) signal or substantially equal to the value of the variable reference signal from generator 65 responsively to a difference between a value of the error (ER) signal and the value of the variable reference signal. In most embodiments, controller 30 also includes an internal voltage regulator 41 that is connected between input 31 and return 32 in order to generate an internal operating voltage on an output 40 that is utilized to operate elements of controller 30 such as clock circuit 44, comparator 68, and latch 54.

Figure 2:
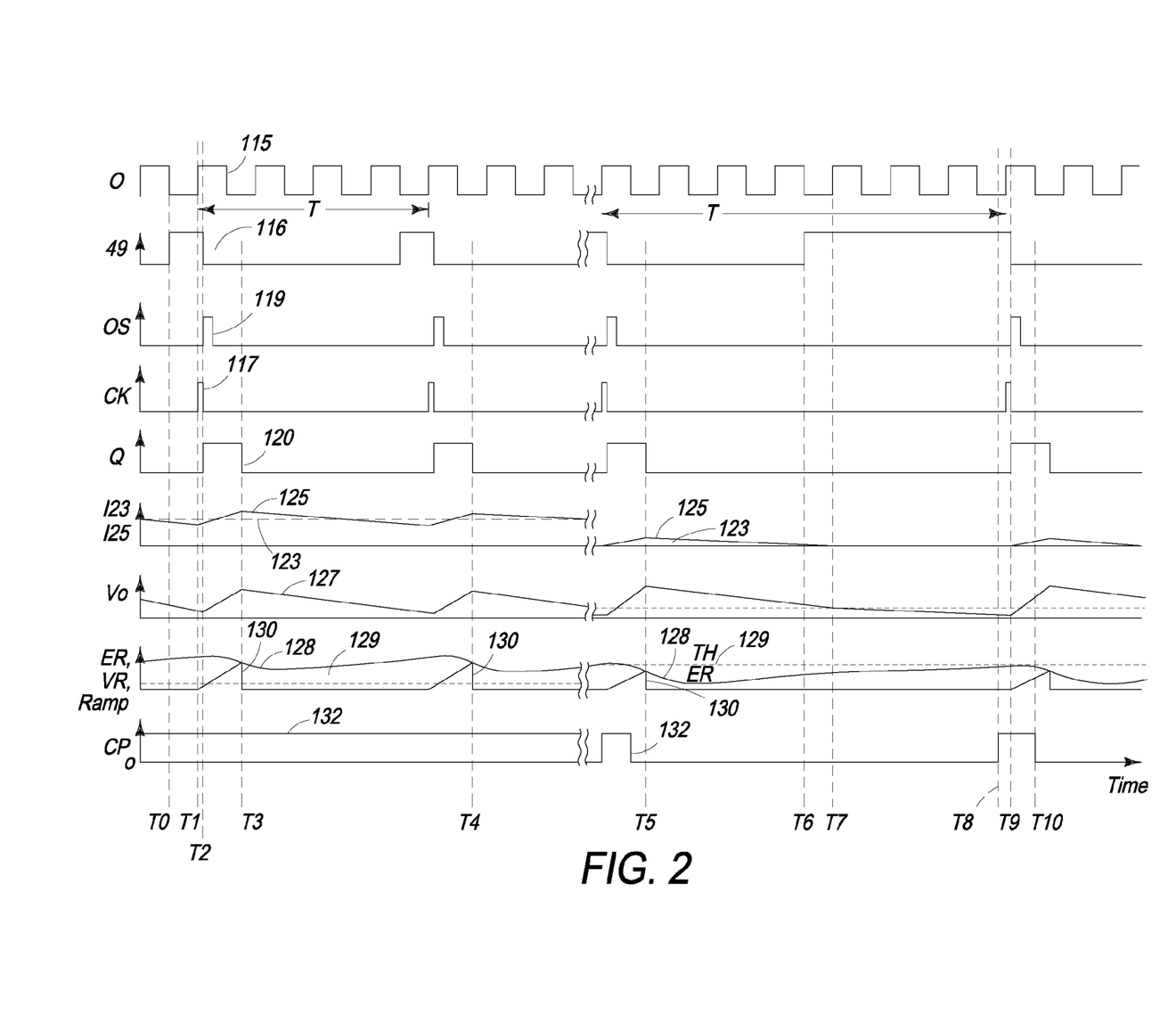
FIG. 2 is a graph having plots that illustrate some of the signals formed during the operation of the power supply controller of FIG. 1 in accordance with the present invention.

FIG. 2 is a graph having plots that illustrate various signals that are generated during the operation of controller 30. The abscissa indicates time and the ordinate indicates increasing value of the illustrated signal. A plot 115 illustrates the oscillator (0) signal from oscillator 46, a plot 116 illustrates the output signal from counter 49, a plot 119 illustrates the output of one-shot 47, and a plot 117 illustrates the clock (CK) signal from clock circuit 44. A plot 120 illustrates the switching signal from the Q output of latch 54. A plot 123 illustrates, as a dashed line, the value of load current 23 and a plot 125 illustrates the value of inductor current 25. A plot 127 illustrates the output voltage (Vo). A plot 128 illustrates the error (ER) signal, a plot 129 illustrates as a dashed line the variable reference (VR) signal formed on an output of generator 65, and a plot 130 illustrates the ramp (RP) signal. A plot 132 illustrates a control signal (CP) on the output of comparator 59 of control circuit 58. This description has references to both FIG. 1 and FIG. 2.

Controller 30 is configured to operate in a normal operating mode and in a light load operating mode. One example of operation in the normal mode is illustrated in FIG. 2 between times T0 and T4, and one example of operation in the light load mode is illustrated between times T5 and T10. In the normal operating mode, load current 23 is sufficient to draw current from capacitor 22 during the off-time of transistor 24 thereby requiring controller 30 to enable transistor 24 at a given frequency. In the light load mode, load current 23 is reduced and controller 30 can operate transistor 24 at a reduced frequency and maintain the charge on capacitor 22. Controller 30 is configured to reduce the frequency of the switching drive signal during operation in the light load mode. Clock circuit 44 uses a high-frequency oscillator signal (O) that is counted down by a counter 49 in order to form a lower frequency clock (CK) signal that is utilized to set latch 54. Oscillator 46 operates at a substantially fixed frequency that is greater than the frequency of the CK signal. Counter 49 counts or divides the signal from oscillator 46, such as by an integer number, which forces the output of counter 49 high. Thus, the period of the CK signal is a multiple of the period of the oscillator (O) signal. As will be seen further hereinafter, the control signal (CP) formed by control circuit 58 selectively varies the multiple that relates the period of the CK signal to the period of the oscillator signal (O). Thus, clock circuit 44 is configured to vary a frequency of the clock (CK) signal responsively to a difference between the value of the error (ER) signal and the value of the variable reference signal.

Control circuit 58 is configured to form a threshold (Th) signal that is used to reset latch 54 and control the on-time of the switching drive signal, thus, the on-time of transistor 24. The threshold signal (Th) is compared to the ramp (RP) signal in order to reset latch 54. As will be seen further hereinafter, circuit 58 is configured to selectively form the value of the threshold (Th) signal to be substantially equal to the value of the error (ER) signal or to be substantially equal to a value of the variable reference (VR) signal from generator 65 responsively to a difference between the value of the error signal (ER) and the value of the variable reference (VR) signal. Thus, control circuit 58 is configured to select either the error signal from error amplifier 57 as the threshold signal or to select the variable reference signal to be the threshold signal.

Referring to FIG. 2 and FIG. 1, assume that just prior to a time T0 the output of counter 49 is low and counter 49 has counted N−1 negative transitions of oscillator 46. At time T0, the output of oscillator 46 goes low which clocks counter 49 and forces the output high. Subsequently, at a time Ti the oscillator (O) signal goes high. The high signals from oscillator 46 and counter 49 force the output of gate 50 high. Assuming that the CP signal from comparator 59 is high, the high from gate 50 forces the output of gate 51 high to set latch 54 and force the Q output high. The high Q output fires one-shot (OS) 47 which resets counter 49 thereby forcing the output of counter 49 low. The low from counter 49 forces the output of gate 50 low thereby forcing the CK signal low as illustrated at a time T2. Consequently, clock circuit 44 forms a very narrow CK signal that is utilized to set latch 54. The high from the Q output of latch 54 also forces output 33 high to initiate a cycle of the switching drive signal on output 33 which enables transistor 24 to supply current 25 to inductor 16. Thus, during the normal operating mode the frequency of the CK signal is substantially equal to the frequency of oscillator 46 divided by the count of counter 49 (referred to hereinafter as the "base frequency") For example, if oscillator 46 operated at one megahertz (1 MHz) and counter 49 had a count of four (4), the base frequency of the switching drive signal would be approximately two hundred fifty kilo-hertz (250 KHz).

The high Q output of latch 54 also forces the output of buffer 55 and output 33 high thereby enabling transistor 24 to supply inductor current 25 to flow through inductor 16. A portion of current 25 charges capacitor 22 and a portion may be used for load 15. Setting latch 54 also forces the Q bar output of latch 54 low which disables transistor 71 thereby enabling current source 70 to begin charging capacitor 73 as illustrated by plot 130 at a time T2. Charging capacitor 73 forms an increasing value of the ramp signal.

During normal operation, the value of inductor current 25 is large, thus, the current sense signal received by amplifier 77 is also large. Variable reference generator 65 subtracts the value of a sense signal (SS) from the output of amplifier 77 from the value of the reference signal from generator 42 to form the variable reference (VR) signal. Subtracting the sense signal (SS) output of amplifier 77 from the value of generator 42 forms the reference (VR) signal to be less than the value formed by generator 42. The value of generator 42 and the gain of amplifier 77 generally are selected so that in the normal operating mode the value of the error (ER) signal is greater than the value of the variable reference signal. The value of the variable reference (VR) signal is selected to be a value that causes the on-time of the SD signal in discontinuous conduction mode (DCM) to be substantially equal to the on-time in the continuous conduction mode (CCM). DCM, but not burst mode, is the operating condition wherein the on-time of the SD signal is short enough for inductor current 25 to become substantially zero between two consecutive on-times of the SD signal.

In the normal operating mode, the output of comparator 59 and the CP signal are high as illustrated by plots 128-130 and 132 at times T0-T4. The high CP signal from comparator 59 enables transistor 61 and disables transistor 63 through inverter 62 thereby coupling the error signal to node 64 as the threshold (Th) signal. The high from comparator 59 also enables gate 51 to be controlled by the output of gate 50, thus, the frequency of the CK signal is the base frequency.

Switching control comparator 68 compares the ramp signal to the threshold signal, thus to the error signal. When the value of the ramp signal increases to the value of the threshold signal (as illustrated by plots 128 and 130 at time T3), the output of comparator 68 goes high to reset latch 54. Resetting latch 54 forces the switching drive signal low (as illustrated by plot 120 at time T3) to begin disabling transistor 24 thereby terminating the on-time of the switching drive signal and the on-time of transistor 24. Thus, comparator 68 controls the on-time of the SD signal by comparing the ramp signal to the threshold signal. Resetting latch 54 also forces the Q bar output high which enables transistor 71 and forces the ramp signal low. After N number of CK negative transitions, counter 49 again goes high and the CK signal again subsequently goes high to initiate another cycle of the switching drive signal (SD). As long as the value of the error signal remains greater than the reference signal from generator 42 minus the SS signal from amplifier 77, controller 30 operates in the normal operating mode.

If the value of load current 23 decreases, the value of the current sense signal is decreased and the value of the output voltage may increase as illustrated by a decreased value of the error signal (see plots 128 and 129 just before a time T5). The decreased value of inductor current 25 decreases the value of the sense signal (SS) from amplifier 77 which increases the value of the variable reference (VR) signal from generator 65 as illustrated by plots 128 and 129 just after time T5. The decreased value of the error signal and the increased value of the variable reference signal force the output of comparator 59 low as illustrated by plot 132 just prior to time T5. At time T5, the ramp signal has increased to the value of the threshold signal (Th) and comparator 68 has reset latch 54 to terminate the on-time and to reset the ramp signal.

At a time T6, the Nth falling edge of the oscillator (O) signal forces the output of counter 49 high as illustrated by plot 116. The next rising edge of the oscillator signal forces the output of gate 50 high. However, because the ER signal is less than the VR signal, the CP signal on the output of comparator 59 remains low which keeps the output of gate 51 low to prevent initiating another switching drive cycle. Thus, latch 54 remains reset. Since transistor 24 is not enabled, inductor current 25 decreases after time T5 and becomes substantially zero near a time T7. Since load 15 requires some current, the current is supplied by capacitor 22 and the value of the output voltage decreases (plot 127 between T5 and T7). The decreased value of the output voltage increases the value of the error signal as illustrated by plot 128 between times T5 and T7. At a time T8, the error (ER) signal becomes greater than the value of the VR signal which forces the CP signal of comparator 59 high. The high CP signal enables gate 51 to be controlled by the output of gate 50. Since the output of counter 49 is still high, the next rising edge of the oscillator signal forces the output of gate 51 high to set latch 54 and initiate another cycle of the switching drive signal at a time T9. This resets counter 49. The switching drive signal enables transistor 24 to supply current 25 to load 15 and to capacitor 22 as illustrated by plot 125 at time T9. Also, the output voltage increases. The increased value of the output voltage decreases the error signal until at a time T10, the error signal becomes less than the variable reference (VR) signal which forces the CP signal on the output of comparator low again as illustrated by plot 132 at time T10. The ramp signal continues to increase until reaching a value that is substantially equal to the Th signal (the variable reference signal in this case). Selectively coupling the larger of the error signal or the variable reference signal to use for determining the on-time also assists in minimizing the amount of variation of the ripple in the value of current 25 over the range of current 25 thereby reducing the ripple in the output voltage. Because the value of the signal from generator 42 and the gain of amplifier 77 are chosen to keep the value of the variable reference signal close to the value of the error signal under the normal operating conditions, the value of the on-time in the light load operation mode is close to the value of the on-time during the normal operating mode. This assists in reducing the variation in the ripple in current 25 thereby reducing the ripple in the output voltage. Also, selectively coupling the larger of the error signal or the variable reference signal to use for determining the on-time also assists in keeping the on-time of the light load mode close to the on-time of the normal operating mode. Additionally, it can be seen that clock circuit 44 varies a frequency, thus the period, of the Ck signal responsively to a difference between the value of the ER signal and a value of the VR signal. It can also be seen that circuit 44 varies the frequency of the CK signal in increments of the period of the oscillator signal.

In order to facilitate this functionality for controller 30, regulator 41 is connected between input 31 and return 32. Reference generator 43 is connected between an output 40 of regular 41 and return 32. The output of reference generator 43 is connected to a non-inverting input of amplifier 57. An inverting input of amplifier 57 is connected to receive the VS signal from input 36. The output of amplifier 57 is commonly connected to a source of transistor 61 and a non-inverting input of comparator 59. An inverting input of comparator 59 is commonly connected to a source of transistor 63 and the output of adder 66. The output of reference generator 42 is connected to a first input of adder 66. A second input or inverting input of adder 66 is connected to the output of amplifier 77. A non-inverting input of amplifier 77 is connected to input 37 and an inverting input is connected to input 38. The output of comparator 59 is commonly connected to a first input of gate 51, a gate of transistor 61, and an input of inverter 62 which has an output connected to a gate of transistor 63. A drain of transistor 63 is commonly connected to a drain of transistor 61 and to an inverting input of comparator 68. A non-inverting input of comparator 68 is connected to node 74. The output of comparator 68 is connected to a reset input of latch 54. The output of oscillator 46 is commonly connected to a first input of gate 50 and a clock input of counter 49. The output of counter 49 is connected to a second input of gate 50. The output of gate 50 is connected to a second input of gate 51 which has an output connected to a set input of latch 54. A Q output of latch 54 is commonly connected to an input of buffer 55 and to an input of one-shot 47. The output of one-shot 47 is connected to a reset input of counter 49. The output of buffer 55 is connected to output 33. The Q bar output of latch 54 is connected to a gate of transistor 71. The drain of transistor 71 is commonly connected to an output of current source 70, node 74, and a first terminal of capacitor 73. A second terminal of capacitor 73 is commonly connected to a source of transistor 71 and to a first terminal of offset circuit 72. A second terminal of offset circuit 72 is connected to return 32. A second terminal current source 70 is connected to output 40 of regulator 41.

Figure 3:
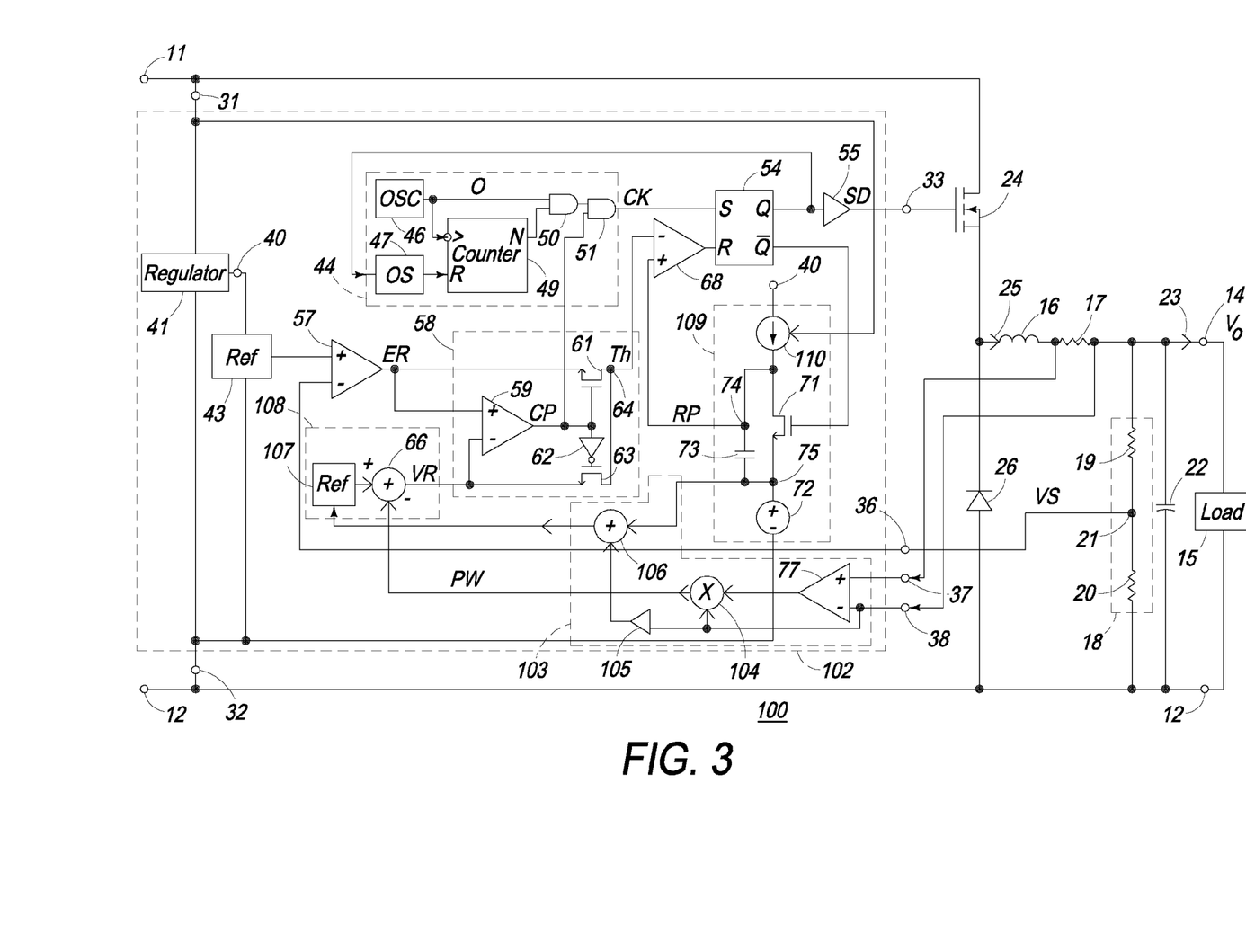
FIG. 3 schematically illustrates an embodiment of a portion of a power supply system that includes a switching power supply controller that is an alternate embodiment of the power supply controller of FIG. 1 in accordance with the present invention in accordance with the present invention.

FIG. 3 schematically illustrates an embodiment of a portion of a power supply system 100 that includes a switching power supply controller 102 that is an alternate embodiment of power supply controller 30 that was described in the description of FIG. 1 and FIG. 2. Controller 102 is similar to controller 30 except that controller 102 uses the value of the input power required by system 100 to adjust the value of the variable reference signal (VR), thus, to assist in controlling the on-time of the SD signal. Additionally, a variable reference circuit 108 of controller 102 includes a reference circuit 107 that can vary the value of the variable reference (VR) signal formed by reference circuit 107. Controller 102 also includes a sense circuit 103 that calculates the input power used by system 100. Because input 38 is connected to output 14, the value of the signal on input 38, relative to return 32, can be used as a feedback signal that is representative of the value of the output voltage. A multiplier 104 multiplies the current sense signal from the output of amplifier 77 by the value of the output voltage to form a fourth feedback signal or power sense signal (PW) that is representative of the instantaneous value of the input power supplied by system 100. The power sense signal (PW) includes a signal, form the output of amplifier 77, that is representative of the instantaneous value of inductor current 25. A buffer amplifier 105 receives the feedback signal from input 38 and forms a second sense signal that is representative of the value of the output voltage. An adder 106 sums the value of offset circuit 72 with the second sense signal to include variations of the voltage of circuit 72 into the VR signal. Adder 66 subtracts the value of the PW signal from the value of the variable reference signal from circuit 107 to form the reference signal (VR) that is used by comparator 59. Using the value of the input power to vary the value of the variable reference signal (VR) provides more accurate control of the on-time of transistor 24 and more accurate control of the ripple in the output voltage especially for systems that have a wide range of output voltages. As can be seen, this assists in making the on-time in the DCM mode more adaptive to changes in the output voltage by varying the VR signal responsively to variations of the output voltage in order to vary the on-time responsively to variations of the output voltage.

A ramp circuit 109 of controller 102 includes a variable current source 110 instead of the fixed current source of controller 30. Variable current source 110 varies the value of the current supplied to capacitor responsively to the value of the input voltage. Varying the value of the current from source 110, more accurately controls the on-time of the switching drive signal as the value of the input voltage varies. For the configuration of controller 102 that is illustrated in FIG. 3, the selected value of the VR signal for this specific on-time condition is given by:

$$VR = ((Gvo - (Gi*I25))*(Vo)) + V72 \qquad (1)$$

where
  Gvo—the voltage gain from Vo to the output of Ref 42;
  Gi—the is the gain from inputs 37/38 to the output of amplifier 77;
  I25—value of inductor current 25; and
  V72—the value of offset circuit 72.

The Gvo term of equation 1 becomes a term that describes a constant ratio between the maximum amplitude of the ramp signal and the input voltage, and the Gi term typically becomes:

$$Gvo = Vrp/Vin, \text{ and}$$

$$Gi = Vrp/(Vin*I23\text{max})$$

where
  Vrp—the maximum amplitude of the ramp signal,
  Vin—The voltage between input 31 and return 32, and
  I23max—The value of load current 23 under full load conditions.

Thus equation (1) becomes:

$$VR = (((Vrp/Vin) - (Vrp/(Vin*I23\text{max})*I23))*(Vo)) + V72. \qquad (2)$$

In order to facilitate this functionality for controller 102, the output of amplifier 77 is connected to a first input of multiplier 104, a second input of multiplier 104 is connected to input 38 and an output of multiplier 104 is connected to the inverting input of adder 66. An input of amplifier 105 is connected to input 38 and an output of amplifier 105 is connected to a first input of adder 106 which has a second input connected to the second terminal of capacitor 73. An output of adder 106 is connected to a control input from reference circuit 107. A control input of current source 110 is connected to input 31.

Figure 4:
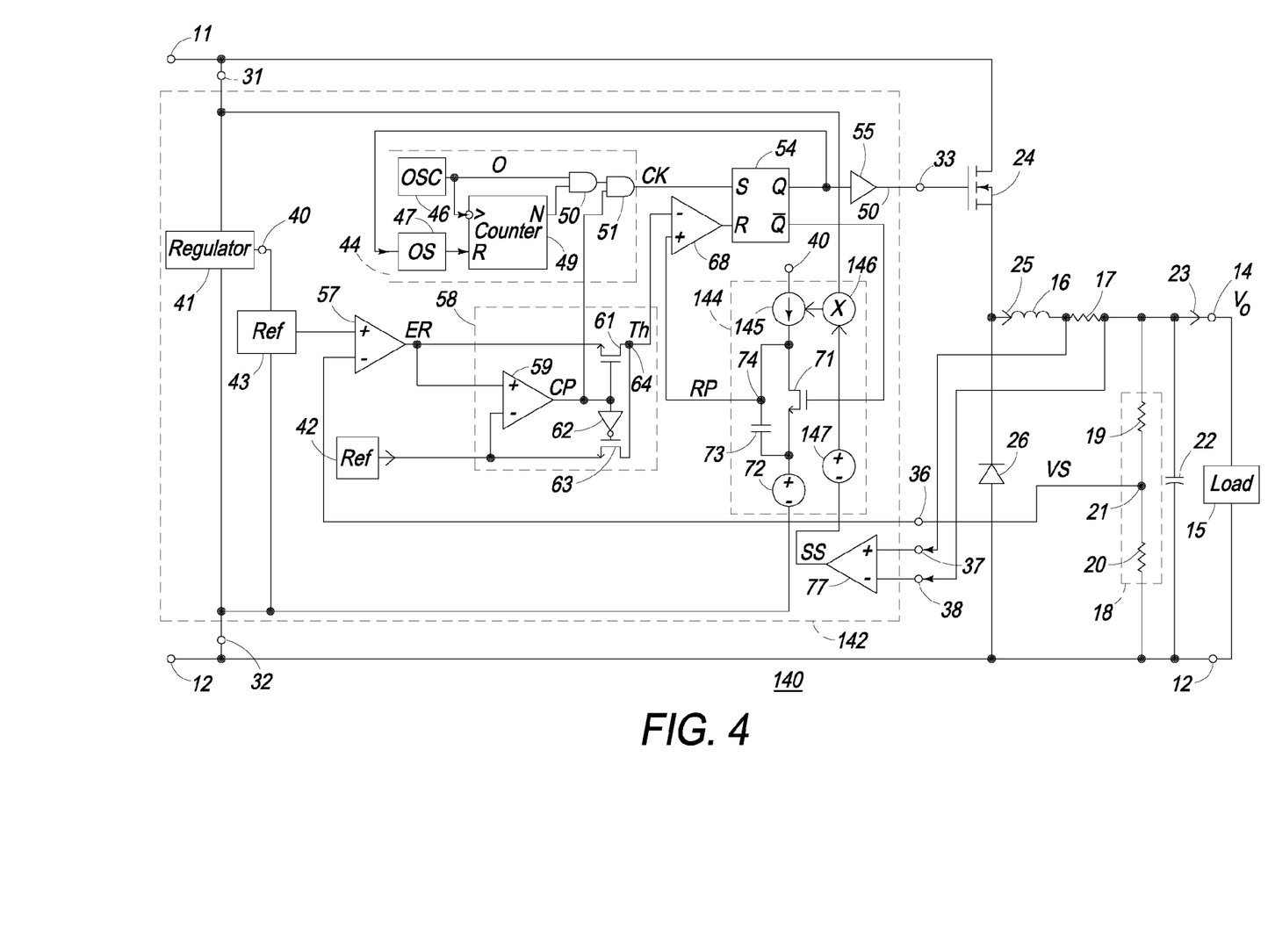
FIG. 4 schematically illustrates an embodiment of a portion of a power supply system that includes another switching power supply controller that is another alternate embodiment of the power supply controller of FIG. 1 in accordance with the present invention in accordance with the present invention.

FIG. 4 schematically illustrates an embodiment of a portion of a power supply system 140 that includes a switching power supply controller 142 that is an alternate embodiment of power supply controller 30 that was described in the description of FIG. 1 and FIG. 2. Controller 142 is similar to controller 30 except that controller 142 uses the value of the sense signal and the input voltage to form a power signal that is representative of the input power. The input power is used to vary the slew rate of the ramp signal formed by a ramp circuit 144. Ramp circuit 144 is similar to ramp circuit 69 except that circuit 144 includes a variable current source 145 instead of fixed current source 70 of controller 30, and also includes a multiplier 146. Multiplier 146 receives the sense signal (SS) from amplifier 77 and the input voltage from input 31 and multiplies them together to form the power signal that is representative of the input power. A voltage source 147 applies an offset voltage to the output of amplifier 77 to assist in keeping the slew rate of the ramp signal greater than zero when current 25 through inductor 16 becomes zero. The input power signal from multiplier 146 is used to vary the value of current source 145 responsively to variation in the input power. Varying the current from source 145 varies the slew rate of the Ramp signal responsively to variations in the input power. Since controller 142 forms a closed loop control system, varying the slew rate of the ramp signal has the same effect on the error (ER) signal and on the CP signal as varying the value of the reference (VR) signal from generator 42.

To facilitate this functionality for controller 142, the output of amplifier 77 is connected to a control input of source 145. Additionally, the output reference generator 42 is connected to the inverting input of comparator 59 and the source of transistor 63.

Figure 5:
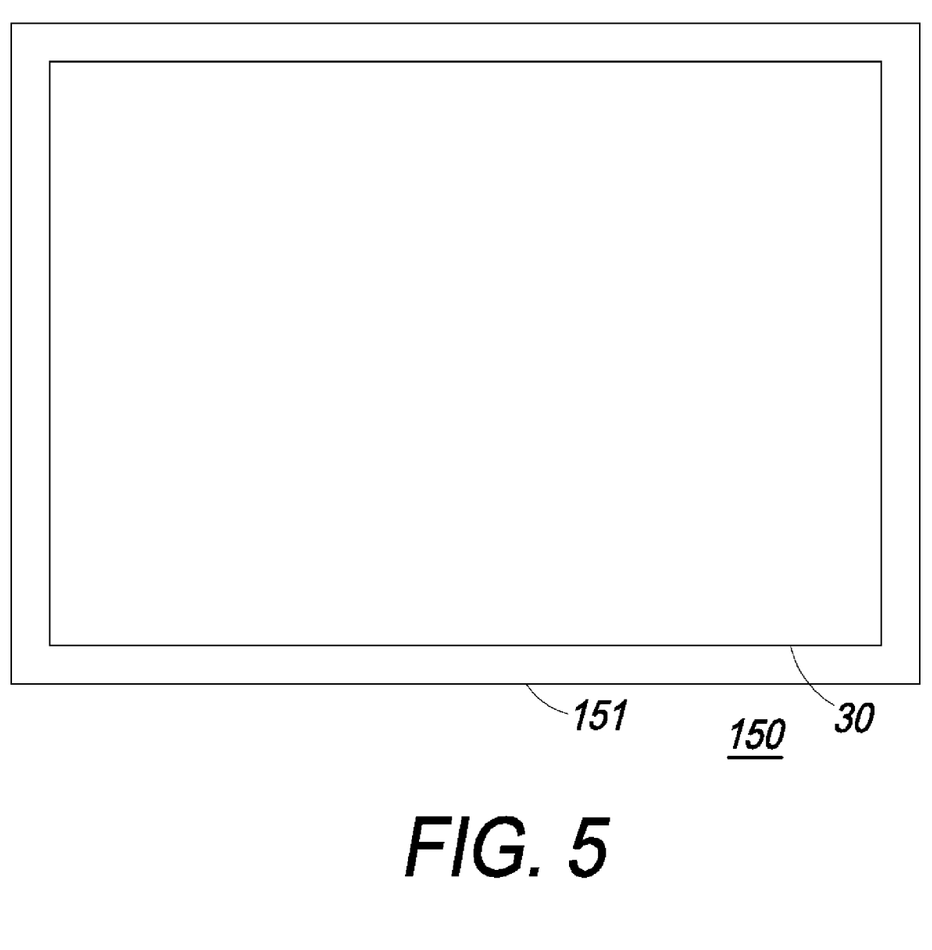
FIG. 5 schematically illustrates an enlarged plan view of a portion of an embodiment of a semiconductor device or integrated circuit that includes the power supply controller of FIG. 1 in accordance with the present invention.

FIG. 5 schematically illustrates an enlarged plan view of a portion of an embodiment of a semiconductor device or integrated circuit 150 that is formed on a semiconductor die 151. Controller 30 is formed on die 151. Die 151 may also include other circuits that are not shown in FIG. 5 for simplicity of the drawing. Controller 30 and device or integrated circuit 150 are formed on die 151 by semiconductor manufacturing techniques that are well known to those skilled in the art.

In view of all of the above, it is evident that a novel device and method is disclosed. Included, among other features, is configuring a power supply controller to vary one of a reference signal responsively to a sense signal in order to control an on-time of the switching drive signal formed by the power supply controller. The power supply controller may also be configured to selectively use either the error signal or the reference signal to vary the on-time. Selectively using either the error signal or the reference signal reduces the current ripple in the output of the system that uses the power supply controller. Alternately, the sense signal may be used to vary a ramp signal that is used to assist in forming the switching drive signal. This also reduces the ripple in the output.

While the subject matter of the invention is described with specific preferred embodiments, it is evident that many alternatives and variations will be apparent to those skilled in the semiconductor arts. Although the subject matter of the invention is described using an exemplary embodiment of a fixed frequency buck power supply controller, the invention is applicable to other power supply configurations such as some transformer isolated configurations. Those skilled in the art will appreciate that the power sense signal formed by controller 102 may be used to vary the slew rate of the ramp signal of controller 142 instead of using only the current sense signal. Additionally, variable current source 110 may be used in either of controllers 30 or 142. Also, non-variable current source 70 may also be used for controller 102. The configuration illustrated for control circuit 58 is an example embodiment that may be replaced by other circuit configurations as long as the configuration selectively couples either the variable reference signal or the error signal to the switching control block responsively to a difference between the values thereof. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:
a clock circuit configured to form a clock signal having a first period;
a PWM block configured to receive the clock signal and form a PWM drive signal to control a current through an inductor in order to regulate an output voltage to a desired value, the PWM drive signal having the first period;
a first input configured to receive a feedback signal that is representative of the output voltage;
an error circuit configured to receive the feedback signal and form an error signal that is representative of a deviation of the output voltage from the desired value;
a ramp generator configured to form a ramp signal wherein the ramp signal has the first period;
a sense circuit configured to form a sense signal that is representative of an instantaneous value of the current through the inductor;
a reference circuit configured to form a reference signal wherein the reference circuit is configured to vary a value of the reference signal responsively to the sense signal;
a control circuit configured to selectively form a threshold signal substantially equal to one of the error signal or the reference signal responsively to a difference between the error signal and the reference signal; and
a PWM comparator actively coupled to compare the ramp signal to the threshold signal to control an on-time of the PWM drive signal.

2. The power supply controller of claim 1 wherein the control circuit includes a comparator coupled to compare the error signal and responsively select either the error signal or the reference signal to the threshold signal.

3. The power supply controller of claim 1 wherein the sense circuit is operably coupled to use the sense signal to form a power signal that representative of an instantaneous value of power supplied by the power supply controller.

4. The power supply controller of claim 3 wherein the sense circuit includes an amplifier coupled to form the sense signal and a multiplier coupled to multiply the sense signal by a signal that is representative of an instantaneous value of the output voltage.

5. The power supply controller of claim 4 wherein the reference circuit is configured to vary the value of the reference signal responsively to the power signal.

6. The power supply controller of claim 1 wherein the clock circuit is configured to selectively vary a frequency of the clock signal responsively to a difference between the error signal and the reference signal.

7. The power supply controller of claim 6 wherein the clock circuit includes an oscillator having a second period that is less than the first period and wherein the clock circuit is configured to vary the frequency of the clock signal in increments of the second period.

8. A power supply controller comprising:
a clock circuit configured to form a clock signal having a first period;
a switching control block configured to receive the clock signal and form a switching drive signal to control a current through an inductor in order to regulate an output voltage to a desired value, the switching drive signal having the first period;
a feedback input configured to receive a feedback signal that is representative of the output voltage;
an error circuit configured to receive the feedback signal and form an error signal that is representative of a deviation of the output voltage from the desired value;
a ramp generator configured to form a ramp signal wherein the ramp signal has the first period;
a reference circuit configured to form a reference signal;
a sense circuit configured to form a sense signal comprising an instantaneous value of the current through the inductor wherein the power supply controller is operably coupled to vary one of the reference signal or the ramp signal responsively to the sense signal; and
a control circuit configured to compare the ramp signal to either the reference signal responsively to a first difference in value between a value of the error signal and a value of the reference signal or to the error signal responsively to a second difference in value between the value of the error signal and the value of the reference signal.

9. The power supply controller of claim 8 wherein the control circuit is configured to selectively form a threshold signal that is substantially equal to the error signal or substantially equal to the reference signal responsively to a difference between the error signal and the reference signal.

10. The power supply controller of claim 9 wherein the control circuit includes a comparator coupled to compare the error signal to the reference signal and responsively select either the error signal or the reference signal to the threshold signal.

11. The power supply controller of claim 9 further including a switching control comparator actively coupled to compare the ramp signal to the threshold signal to control an on-time of the switching drive signal.

12. The power supply controller of claim 8 wherein the sense circuit is operably coupled to form the sense signal to be representative of an instantaneous value of power supplied by the power supply controller.

13. The power supply controller of claim 12 wherein the sense circuit includes an amplifier coupled to form a current sense signal that is representative of the current through the inductor and a multiplier coupled to multiply the current sense signal by a signal that is representative of an instantaneous value of the output voltage.

14. The power supply controller of claim 13 wherein the sense circuit is configured to vary one of a slew rate of the ramp signal, an offset voltage of the ramp signal, or a value of the reference signal responsively to the sense signal.

15. The power supply controller of claim 8 wherein the clock circuit is configured to selectively vary a frequency of the clock signal responsively to a difference between the error signal and the reference signal.

16. A method of forming a power supply controller comprising:
configuring the power supply controller to form a ramp signal and to use the ramp signal to form a switching signal that is used to regulate an output voltage to a desired value;
configuring the power supply controller to receive a feedback signal that is representative of a value of an output of a power supply system;
configuring the power supply controller to form an error signal that is representative of a deviation of the output voltage from a desired value;
configuring a clock circuit to form a first clock signal having a first period of a substantially fixed duration, to count occurrences of the first clock to form a second clock signal having a second period that is a multiple of the first period including resetting the count responsively to a state of the switching signal, and to vary the multiple responsively to a difference between the error signal and a reference signal; and
configuring the power supply controller to compare the ramp signal to a threshold signal and to form the threshold signal substantially equal to either the error signal responsively to a first difference in value between a value of the error signal and a value of the reference signal or substantially equal to the error signal responsively to a second difference in value between the value of the error signal and the value of the reference signal.

17. The method of claim 16 further including configuring the power supply controller to form a sense signal that is representative of the feedback signal and to vary one of the reference signal or the ramp signal responsively to the sense signal.

18. The method of claim 16 further including configuring the power supply controller to compare the ramp signal to a threshold signal to adjust a duty cycle of the switching signal and to selectively couple either the reference signal or the error signal to be the threshold signal responsively to the difference between the error signal and the reference signal.

19. The power supply controller of claim 1 wherein the control circuit includes the control circuit configured to form the threshold signal substantially equal to error signal responsively to a first value of the difference between the error signal and the reference signal and to form the threshold signal substantially equal to the reference signal responsively to a second value of the difference between the error signal and the reference signal.

20. The method of claim 18 wherein configuring the power supply controller to compare the ramp signal to a threshold signal includes configuring the power supply controller to form the threshold signal as substantially the error signal responsively to a first value of the difference between the error signal and the reference signal so that the ramp signal is compared to substantially the error signal and to form the threshold signal as substantially the reference signal responsively to a second value of the difference between the error signal and the reference signal so that the ramp signal is compared to substantially the reference signal.

* * * * *